US012417225B2

(12) United States Patent
Vijayan et al.

(10) Patent No.: US 12,417,225 B2
(45) Date of Patent: *Sep. 16, 2025

(54) MACHINE LEARNING-IMPLEMENTED CHAT BOT DATABASE QUERY SYSTEM FOR MULTI-FORMAT DATABASE QUERIES

(71) Applicant: Tekion Corp, Pleasanton, CA (US)

(72) Inventors: Jayaprakash Vijayan, Dublin, CA (US); Ved Surtani, Bengaluru (IN); Nitika Gupta, Bengaluru (IN); Malarvizhi Saravanan, Bengaluru (IN); Anirudh Saria, Kathmandu (NP); Amrutha Dharmaraj, Karnataka (IN)

(73) Assignee: Tekion Corp, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/809,284

(22) Filed: Aug. 19, 2024

(65) Prior Publication Data

US 2024/0411755 A1 Dec. 12, 2024

Related U.S. Application Data

(63) Continuation of application No. 17/508,442, filed on Oct. 22, 2021, now Pat. No. 12,105,704.

(51) Int. Cl.
*G06F 16/2452* (2019.01)
*G06F 16/215* (2019.01)
(Continued)

(52) U.S. Cl.
CPC ...... *G06F 16/24522* (2019.01); *G06F 16/215* (2019.01); *G06F 16/2365* (2019.01);
(Continued)

(58) Field of Classification Search
CPC ............. G06F 16/24522; G06F 16/285; G06F 16/215; G06F 16/9535; G06F 16/2365; G06F 16/248; G06N 20/00
See application file for complete search history.

(56) References Cited

U.S. PATENT DOCUMENTS

| 9,424,233 | B2 | 8/2016 | Barve et al. |
| 10,750,122 | B2 | 8/2020 | Stewart et al. |
(Continued)

FOREIGN PATENT DOCUMENTS

WO    WO-2019118927 A2 *  6/2019  ....... G06F 16/90332

OTHER PUBLICATIONS

International Search Report and Written Opinion, Patent Cooperation Treaty Application No. PCT/US2022/047018, dated Feb. 6, 2023, 12 pages.
(Continued)

*Primary Examiner* — Apu M Mofiz
*Assistant Examiner* — Farhad Agharahimi
(74) *Attorney, Agent, or Firm* — Fenwick & West LLP

(57) ABSTRACT

A device receives a query from a user associated with a car dealership and applies the query to a first trained machine learning model configured to predict an intent, and to a second trained machine learning model to predict a set of entities. The device generates a normalized representation of the first query that is database language agnostic based on the predicted intent and the predicted set of entities, and translates the normalized representation into a second query having a format compatible with a language of a database of the car dealership. The device fetches data from the database of the car dealership using the second query, and provides the data for display to the user.

20 Claims, 6 Drawing Sheets

(51) Int. Cl.
*G06F 16/23* (2019.01)
*G06F 16/248* (2019.01)
*G06F 16/28* (2019.01)
*G06F 16/9535* (2019.01)
*G06N 20/00* (2019.01)

(52) U.S. Cl.
CPC .......... *G06F 16/248* (2019.01); *G06F 16/285* (2019.01); *G06F 16/9535* (2019.01); *G06N 20/00* (2019.01)

(56) References Cited

U.S. PATENT DOCUMENTS

| | | | |
|---|---|---|---|
| 2006/0026147 A1* | 2/2006 | Cone | G06F 16/9538 |
| 2007/0016616 A1* | 1/2007 | Brill | G06F 40/232 |
| 2007/0203863 A1* | 8/2007 | Gupta | G06N 20/00 706/20 |
| 2011/0246468 A1* | 10/2011 | Raines | G06Q 30/0603 707/740 |
| 2013/0262501 A1* | 10/2013 | Kuchmann-Beauger | G06F 16/24535 707/769 |
| 2013/0282682 A1* | 10/2013 | Batraski | G06F 16/951 707/706 |
| 2016/0189047 A1* | 6/2016 | Meij | G06F 16/951 706/11 |
| 2018/0260384 A1* | 9/2018 | Pasupalak | G10L 15/26 |
| 2019/0034813 A1* | 1/2019 | Das | G06N 5/022 |
| 2019/0258722 A1* | 8/2019 | Guo | G06F 16/9024 |
| 2020/0012721 A1 | 1/2020 | Pasupalak et al. | |
| 2020/0035244 A1* | 1/2020 | Kim | G06F 40/30 |
| 2020/0050662 A1* | 2/2020 | Bhat | G06F 18/211 |
| 2020/0090270 A1* | 3/2020 | Dash | G06Q 40/03 |
| 2021/0012408 A1 | 1/2021 | Price et al. | |
| 2021/0019309 A1 | 1/2021 | Yadav et al. | |

OTHER PUBLICATIONS

Li, Z. et al., "Addressing Inquiries about History: An Efficient and Practical Framework for Evaluating Open-domain Chatbot Consistency," arXiv:2106.02228v1. Jun. 4, 2021, pp. 1-11.
Mamaniva, R. et al., "Online Chat bot for Car Dealership," International Journal of Computer Trends and Technology, Apr. 14, 2020, vol. 68, No. 4, pp. 12-13, ISSN 2231-2803.
European Patent Office, Extended European Search Report, EP Patent Application No. 22884356.1, Jan. 9, 2025, 11 pages.
Mittal, A. et al., "Bootstrapping Chatbot Interfaces to Databases," CODS COMAD, Jan. 2021, pp. 47-55.
United States Office Action, U.S. Appl. No. 17/508,442, Feb. 15, 2022, 30 pages.
United States Office Action, U.S. Appl. No. 17/508,442, Apr. 1, 2022, 33 pages.
United States Office Action, U.S. Appl. No. 17/508,442, Aug. 15, 2022, 38 pages.
United States Office Action, U.S. Appl. No. 17/508,442, Dec. 19, 2022, 39 pages.
United States Office Action, U.S. Appl. No. 17/508,442, Mar. 31, 2023, 41 pages.
United States Office Action, U.S. Appl. No. 17/508,442, Nov. 9, 2023, 41 pages.
United States Office Action, U.S. Appl. No. 17/508,442, Dec. 29, 2023, 46 pages.

* cited by examiner

400

Receive a first query from a user associated with a vehicle dealership 410

Apply the first query to a first trained machine learning model to predict an intent of the first query 420

Apply the first query to a second trained machine learning model to predict a set of entities of the first query 430

Generate a normalized representation of the first query based on the predicted intent and set of entities 440

Translate the normalized representation of the first query into a second query having a format compatible with a language of a database of the car dealership 450

Fetching data from the databased of the car dealership associated with the predicted intent and set of entities using the second query 460

Provide the data for display 470

FIG. 4

MACHINE LEARNING-IMPLEMENTED CHAT BOT DATABASE QUERY SYSTEM FOR MULTI-FORMAT DATABASE QUERIES

CROSS-REFERENCE TO RELATED APPLICATIONS

This application is a continuation of U.S. application Ser. No. 17/508,442, filed Oct. 22, 2021, the contents of which are herein incorporated by reference in its entirety.

TECHNICAL FIELD

This disclosure generally relates to the field of databasing, and more particularly relates to format-agnostic machine learning models for driving a chat bot to perform database lookups across multiple, differently formatted databases.

BACKGROUND

Bot systems enable users to conduct online conversations with automated entities in order to obtain data. However, current bot systems are not adapted to cope with data requests for data stored in a plurality of databases having different formats. In addition, current query systems require training steps involving large amounts of labeled training data that are trained using particular data formats. For example, training a chat bot to accept queries for an SQL database requires an impractical amount of training data, and retraining the model to accept new types of queries will again require huge amounts of training data, rendering such chat bots impractical or impossible to implement in environments having large amounts of types of requests.

SUMMARY

Systems and methods are disclosed herein for an improved mechanism for generating efficient query responses from databases of vehicle dealerships where the databases are in any format. A chatbot implementation is used that does not require training a model to understand queries with training data for every type of query in every type of language and instead reduces dimensions needed to perform a successful query through intent detection and entity recognition. Search parameters are normalized to database format-agnostic queries and can be used across any vehicle dealership database.

In an embodiment, a chat bot system receives a first query from a user associated with a car dealership through a user interface. The first query is applied to a first trained machine learning model that is configured to predict an intent of the first query. The first machine learning model may be a classification model. In some embodiments, the classification model is a supervised model, and the model is configured to classify the first query as at least one of: an overall intent query, a sales query, or a services query.

The first query may be a text query. In these embodiments, the text query may be processed using a natural language processing model configured to identify spelling errors in the text query. In addition, responsive to identifying one or more spelling errors in the text query, modifying the text query to remove the one or more spelling errors. In some embodiments, first query is a voice query. In these embodiments, audio data is received from the user via the user interface, the audio data associated with the first query. Further, the audio data is applied to a third trained machine learning model configured to generate a transcript from the audio data, and a text query is generated from the transcript.

In addition, the first query is applied to a second machine learning model that is configured to predict the first set of entities of the first query. The second trained machine learning model may be an entity recognition model, where an entity of a query describes a characteristic of the query with keywords. The entity recognition model may be a deep learning model. An entity of the predicted set of entities may be associated with a first value in a set of values. In these embodiments, an additional query recommendation for an additional query is randomized based on additional values in the set of values. The randomized query recommendation for the additional query may be provided for display on the user interface. Further, a method of randomizing an additional query recommendation may be updated based on one or more responses to additional query recommendations from car dealerships.

A normalized representation of the first query is generated based on the predicted intent and the predicted set of entities. In some embodiments, metadata with the car dealership is extracted. In these embodiments, the normalized representation of the first query may be further based on the extracted metadata. In some embodiments, generating the normalized representation includes filtering data associated with the first query based on a level of importance associated with one or more data values. In these embodiments, the normalized representation includes data with at least a threshold level of importance.

A format of the normalized representation of the first query is database language agnostic. The normalized representation of the first query is translated into a second query having a format compatible with a language of a database of the car dealership. Data is fetched from the database of the car dealership associated with the predicted intent and the predicted set of entities using the second query. The data is provided for display to the user on the user interface.

The first query may be associated with a requested action. In these embodiments, one or more documents associated with the requested action are accessed. In addition, one or more metadata values are inputted into the one or more documents based on the requested action. Further, the one or more documents are provided for display to the user via the user interface.

In some embodiments, a query recommendation for an additional query is generated based on the predicted set of entities of the first query. The query recommendation for the additional query may be provided for display on the user interface. Responsive to receiving an indication that the user interacted with the additional recommendation, data associated with the additional query is fetched and the data associated with the additional query is provided for display to the user.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 illustrates an exemplary process for operating a chat bot system, in accordance with one embodiment of the disclosure.

FIG.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Vehicle Dealership Chat Bot System Environment

Figure 1:
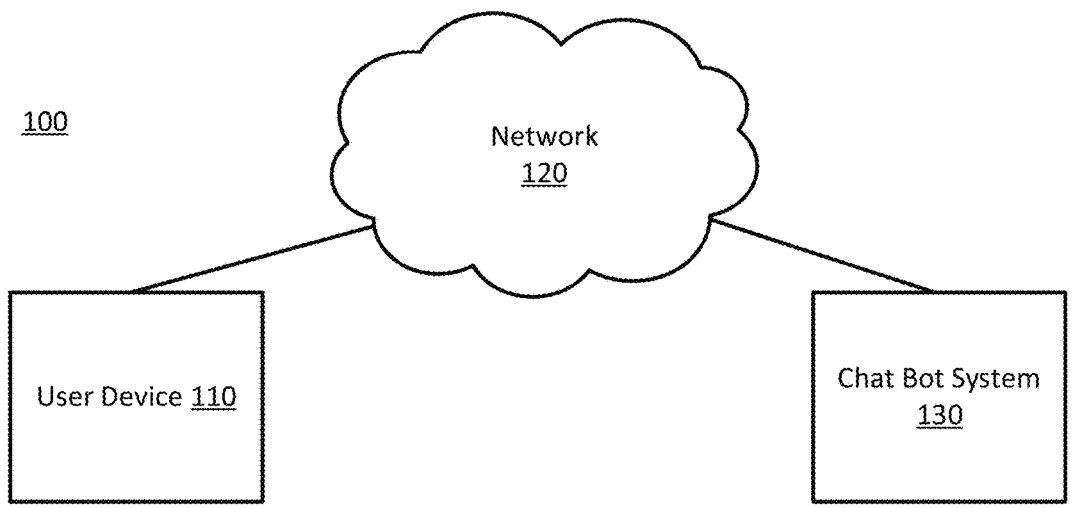
FIG. 1 illustrates one embodiment of an exemplary system environment for implementing a chat bot system.

Figure (FIG. 1 illustrates one embodiment of an exemplary system environment for implementing a chat bot system. As depicted in FIG. 1, environment 100 includes user device 110, network 120, and chat bot system 130. User device 110 may be any client device, such as a mobile phone, laptop, personal computer, kiosk, and/or any other device having a user interface that displays data to a user, accepts input from a user, and is configurable to communicate with chat bot system 130. Network 120 may be any network, such as the Internet, WiFi, local area network, wide area network, and so on, that enables data communications between user device 110 and chat bot system 130. Particulars of chat bot system 130 are disclosed below with respect to FIG. 2.

Figure 2:
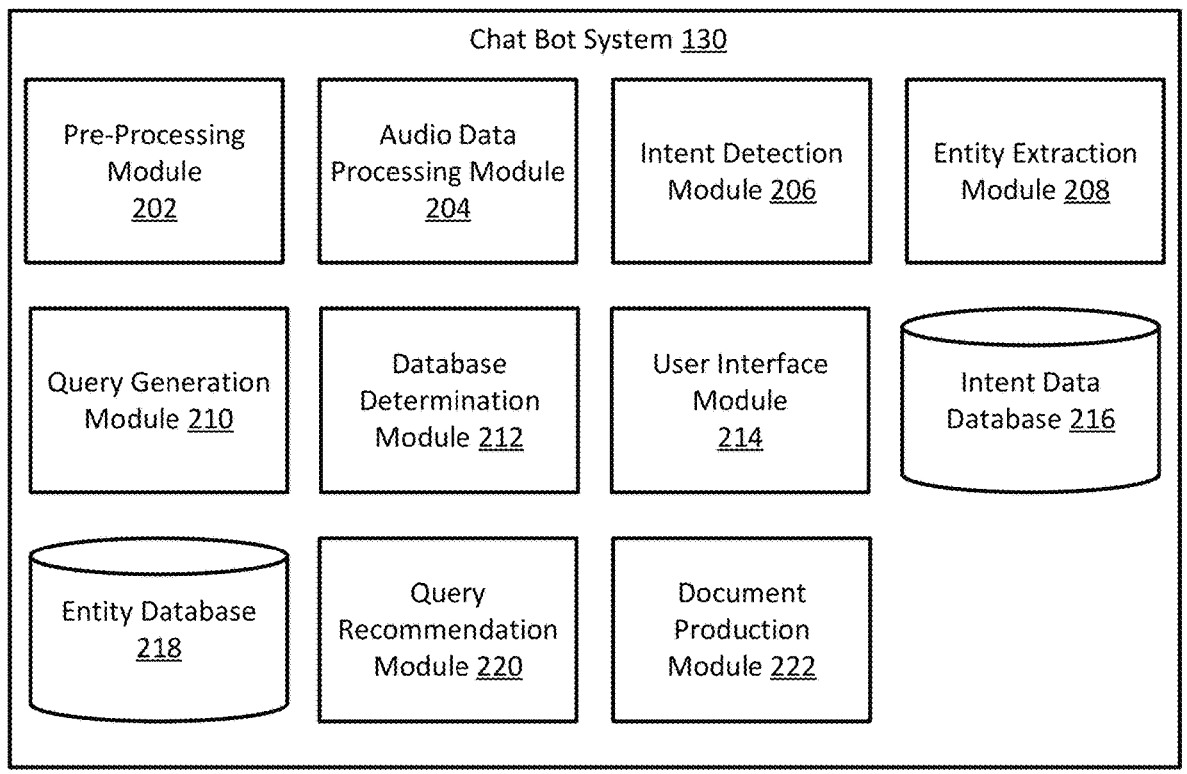
FIG. 2 illustrates one embodiment of exemplary modules and databases for implementation of the chat bot system.

FIG. 2 illustrates one embodiment of exemplary modules and databases for implementation of a chat bot system. As depicted in FIG. 2, chat bot system 130 includes pre-processing module 202, audio data processing module 204, intent detection module 206, entity extraction module 208, query recommendation module 210, database determination module 212, user interface module 214, intent data database 216, entity database 218, query recommendation module 220, and document production module 222. The modules and databases depicted with respect to FIG. 2 are merely exemplary; fewer or additional modules and/or databases may be used to achieve the functionality disclosed herein. Moreover, while chat bot system 130 is depicted as a single entity, functionality of chat bot system 130 may be distributed over multiple computing devices that communicate as needed using network 120.

Chat bot system 130 facilitates query generation based on input received from a user. For example, a representative of a vehicle dealership may input text into the chat bot about a total number of deals closed in a given time period. Chat bot system 200 may determine the information desired by the user based on the input text, and may generate a query based thereon. Given that different vehicle dealerships, and even different branches of those dealerships, may use databases having different formatting constraints, chat bot system 200 may generate a format-agnostic query. For example, different databases may be used to track deals information, inventory information, service information, and so on for different vehicles. The query may then be used to fetch the information from the appropriate database, and chat bot system 200 may utilize the fetched information to respond to the query.

Pre-processing module 202 may optionally be used to pre-process input of the user. Pre-processing the user may entail adjusting the input to conform the input to one or more policies. For example, special characters may be removed, spelling may be corrected, spacing may be adjusted, and so on, as dictated by the one or more policies. The input may be textual or audio (e.g., voice input). Where the input is audio, audio data processing module 204 may be used to process the data prior to any pre-processing to be performed by pre-processing module 202. The processing of audio may include transcribing the audio to text. Where the audio is unclear, the processing may further include modifying the audio prior to performing a transcription.

Intent detection module 206 determines an intent of the input. The term intent, as used herein, may refer to a classification of input, where different classifications correspond to different sets of searchable data. For example, the input might be asking a question about data relating to one of many different departments of a dealership, and potential intents may include sales, deals, service, parts, inventory, and so on. Each of these potential intents may correspond to different collections of data (e.g., where different databases store data relating to each different type of intent).

Intent detection module 206 may determine intent using a supervised machine learning model. The supervised machine learning model may be trained using training samples that show various inputs (e.g., text strings) as labeled by their corresponding intent. Each different intent type may have its own robust training set, such that a full universe of candidate intents is reflected in the training data. Intent detection module 206 may apply input received from the user to the machine learning model, and may receive as output from the model a classification of an intent that corresponds to the input. Alternatively, intent detection module 206 may receive probabilities corresponding to candidate intents to which the input may correspond as output from the machine learning model, and may compare each probability to a threshold, where one or more intents having probabilities exceeding the threshold are determined to be classifications of the input.

Entity extraction module 208 extracts or otherwise recognizes entities based on the input of the user. Some of the extracted entities are extracted directly from the input (e.g., by identifying entities within text input by the user), and others are extracted using auxiliary information. To extract entities directly from the text, entity extraction module 208 may apply the text to an entity extraction model. The entity extraction model may be a machine learning model, a statistical model, or the like. For example, the entity extraction model may be a deep learning model.

The term entity, as used herein, may refer to a structured piece of information that can be extracted from a user's message. For example, an entity may be a time, place, name, electronic communication address, or any other extractable information. With respect to vehicles, an entity may be a make, model, and/or year of a vehicle, or any other description of a vehicle. To exemplify what an entity is, and how entities are extracted from user input, consider a user input of "total deals closed last month". An entity extraction model (e.g., as a deep learning model implementation) may have strong correlations between certain words and their corresponding entities, strong correlations between where a word falls in a sentence and a corresponding entity, and so on. Following the exemplary user input, the term "total" may have a strong correlation to an entity of "count", and the term "closed" may have a strong correlation to an entity of "status". The term "count" is a category of words (e.g., if a user is asking for a "total" or an "aggregate", they are asking about something relating to an entity of "count"). The term "status" is a category of states that a user may be asking about (e.g., "closed," "open," "in progress," etc.). To identify entities directly extracted from user input, entity extraction module 208 applies the user input to the entity extraction model, and receives as output from the entity extraction model the identified entities.

In an embodiment, entity extraction module 208 is trained using training data, such as historical user input, with labels indicating entities. Additionally or alternatively, an administrator of chat bot system 130 may define regular expressions from which to extract entities based on a character pattern. Synonyms may be defined that maps extracted entities to predefined values or predefined metadata (e.g., pre-defined from terms used in a database to be queried of a vehicle dealer), such that values other than the literal text extracted may be used for queries. Synonyms may be used when there are multiple ways users refer to the same thing.

Query generation module 210 generates a query using the identified intent(s) and entities. Query generation module 210 generates the query in a format-agnostic manner (e.g., by normalizing the intent(s) and entities into a JSON string). In an embodiment, query generation module 210 determines a level of importance of extracted metadata, and filters out extracted metadata from the query (either prior to or after the query is generated) where the level of importance does not meet a threshold. The level of importance threshold may be predetermined by an administrator. In order to determine the level of importance, query generation module 210 may compare each extracted metadata (or categories/entities corresponding thereto) to a pre-defined mapping of the metadata (or category/entity corresponding thereto) that maps what is extracted to a level of importance, and may assigned the mapped level of importance to the extracted metadata.

As an example of query generation, consider a user input of "Total deals closed so far". Intent detection module 206 may classify this string as having an intent of "deals," and entity extraction module 208 may extract "total" and "closed" as entities. Query generation module 210 therefore constructs an intermediate string, such as a JSON string (e.g., that may be customized based on different applications or database formats). The extracted entities from the user queries may be converted into any format to make it compatible with metadata of a database with segregation of entities into different categories. For example, aggregates like 'total', 'average', filter dimensions such as 'status', and so on, may be mapped with metadata of the database. An intermediate exemplary JSON string for this example may be as follows: {'businessType': 'DEALS', 'entities': {'filters': [{'filter_value': ['BOOKED', 'CLOSED_OR_SOLD'], 'filter_dimension': 'status'}, {'filter_value': ['HOUSE', 'BUSINESS', 'PERSONAL', 'ONLY_TRADES', 'FLEET'], 'filter_dimension': 'type'}, {'filter_value': ['4'], 'filter_dimension': 'dealerId'}], 'aggregates': [{'aggregate_func': 'DOC_COUNT', 'aggregate_metrics': 'id'}]}}. This intermediate JSON may then be converted to a reporting JSON that is database language agnostic, and then may be finally converted into a specific format, such as an SQL format, elastic search format, and so on. An exemplary reporting JSON may be as follows: [{'key': 'status', 'field': 'deals.status', 'values': ['BOOKED', 'CLOSED_OR_SOLD'], 'operator': 'IN', 'orFilters': None, 'andFilters': None, 'notFilters': None, 'script': None}, {'key': 'type', 'field': 'deals.type', 'values': ['HOUSE', 'BUSINESS', 'PERSONAL', 'ONLY_TRADES', 'FLEET'], 'operator': 'IN', 'orFilters': None, 'andFilters': None, 'notFilters': None, 'script': None}, {'key': 'dealerId', 'field': 'deals.dealerId', 'values': ['4'], 'operator': 'IN', 'orFilters': None, 'andFilters': None, 'notFilters': None, 'script': None}].

By generating a normalized query string based off of intent and entity determinations, advantages are achieved, in that dimensions are reduced relative to conventional solutions that generate query strings using particular formats (e.g., SQL formats). That is, training models to classify intent and determine entities generically, rather than with respect to formatted data queries, reduces the number of dimensions needed to be known to accurately reform a data query by at least one order of magnitude, and potentially several orders of magnitude. Where format-specific queries are to be directly generated, a chat bot implementation would be impractical or impossible, requiring a huge amount of training data and processing power to correctly output a query. Thus, a further advantage of generating normalized query strings using intent and entity determinations is the advantage of enabling an improved user interface for obtaining reporting data via a chat bot.

Database determination module 212 determines one or more databases to which the query is to be sent based on the intent(s) and/or entities. Database determination module 212 then determines a format or language used by the identified database(s) (e.g., by referencing an index that maps format/language to database, by querying the database as to format/language used, and/or any other manner). Database determination module 212 translates the query into the determined format (e.g., to an SQL format or an elastic format, depending on the determined format). The translation occurs according to a set of rules that applies to the given format.

User interface module 214 accepts input from the user, and provides output to the user. As described above, the input may be provided via any manner, including typing text, voice input, and any other form of input. The output may be visual or audio. Exemplary user interfaces that user interface module 214 drives are shown in FIGS. 3A-3C, and described in further detail with respect to those figures below.

Intent data database 216 stores data relating to intent information, such as training data and trained classifiers used to identify intent. As feedback is received, intent data database 216 may store further information (e.g., input that reflects that the wrong information has been provided), and may store this further information in raw form or in extracted form (e.g., where errors in intent are identified and stored). This data may be used by intent prediction module 206 to re-train a classifier to more accurately predict intent.

Entity database 218 stores information used in the process of determining entities. This may include models themselves and/or correlations that are reflected by the models. This may also include rules for determining entities (e.g., rules for processing auxiliary data for any given vehicle dealership), as well as any entity information extracted or determined during the process of determining entities. Query recommendation module 220 is a module that drives recommendations that are shown in FIG. 3B, and will be described in further detail in the context of FIG. 3B. Document production module 222 is a module that drives document production as shown in FIG. 3C, and will be described in further detail in the context of FIG. 3C.

Figure 3A:
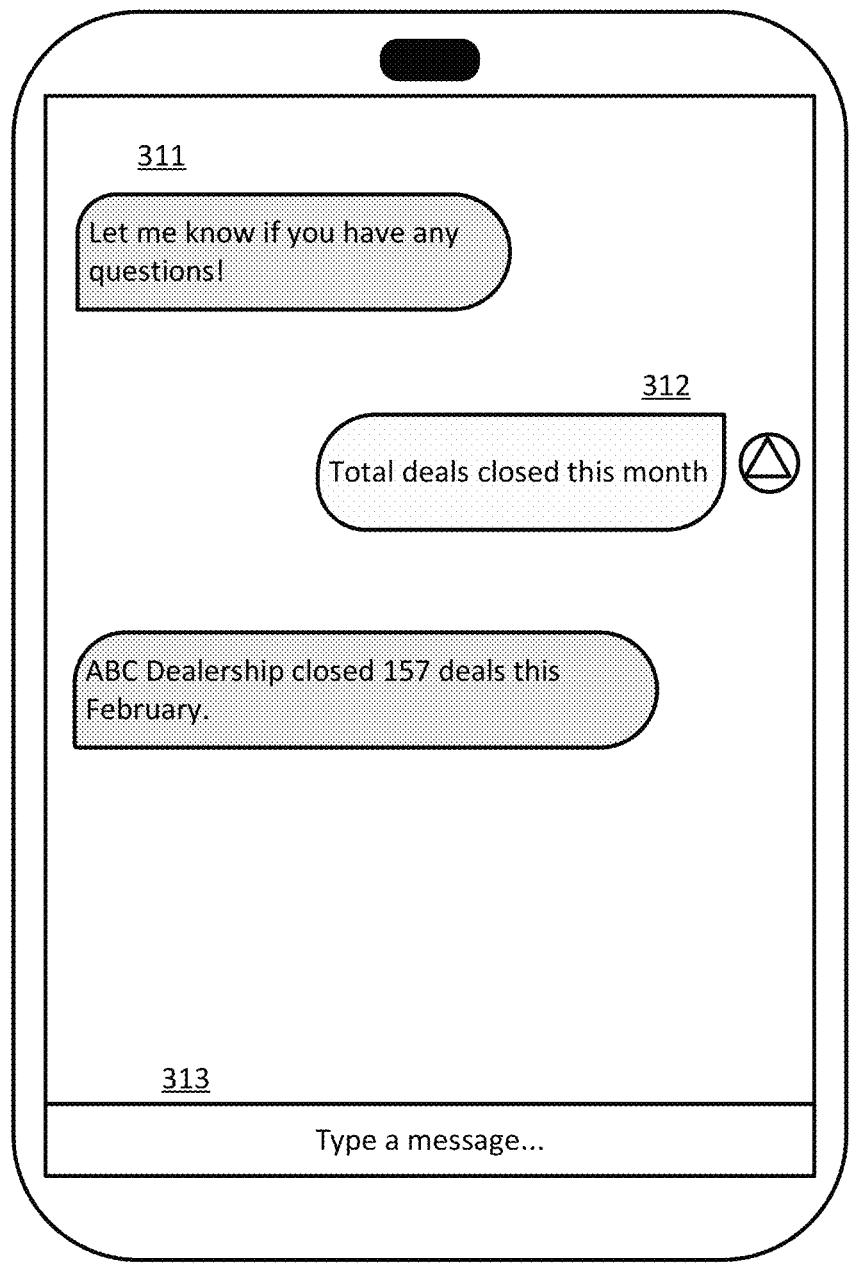
FIG. 3A illustrates one embodiment of a user interface that triggers operation of the chat bot system to produce search results.
Figure 3B:
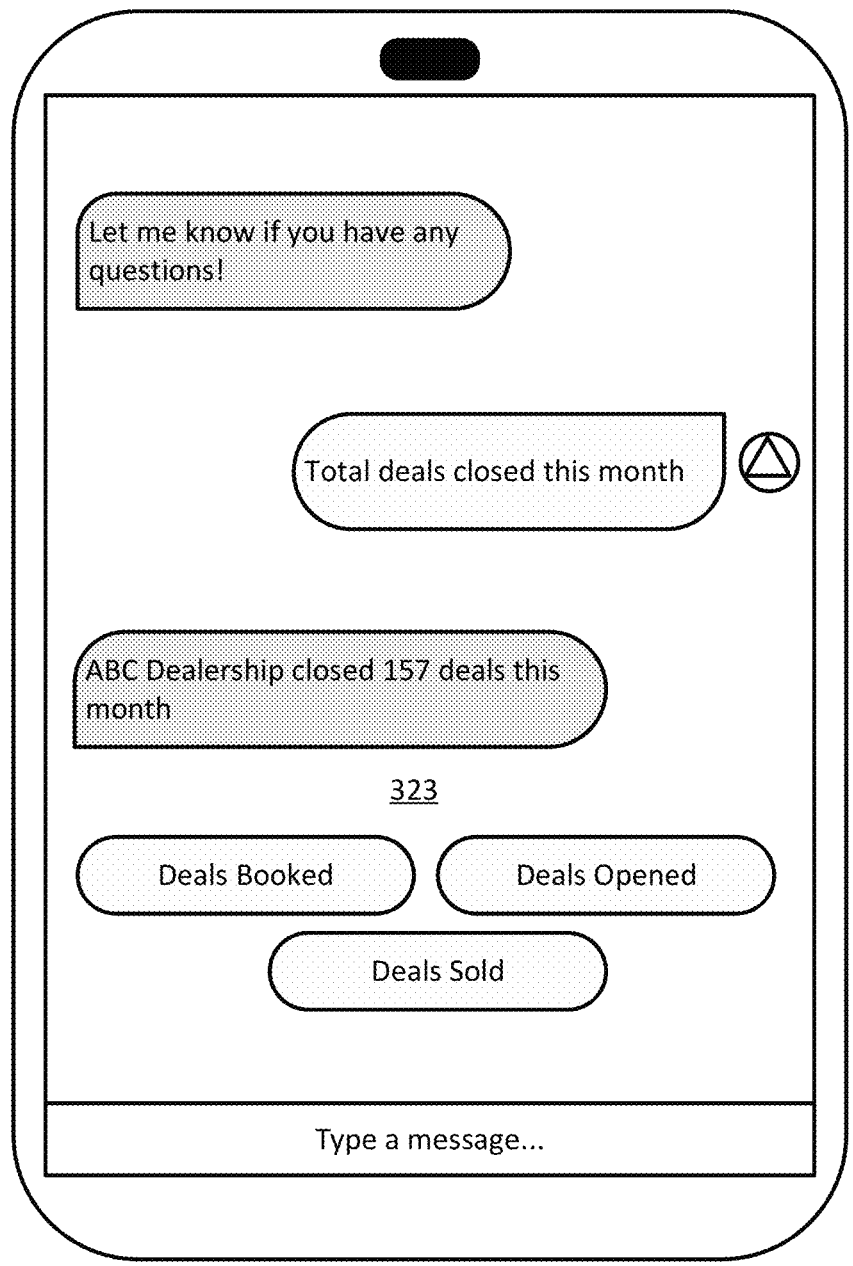
FIG. 3B illustrates one embodiment of a user interface that recommends alternative queries.
Figure 3C:
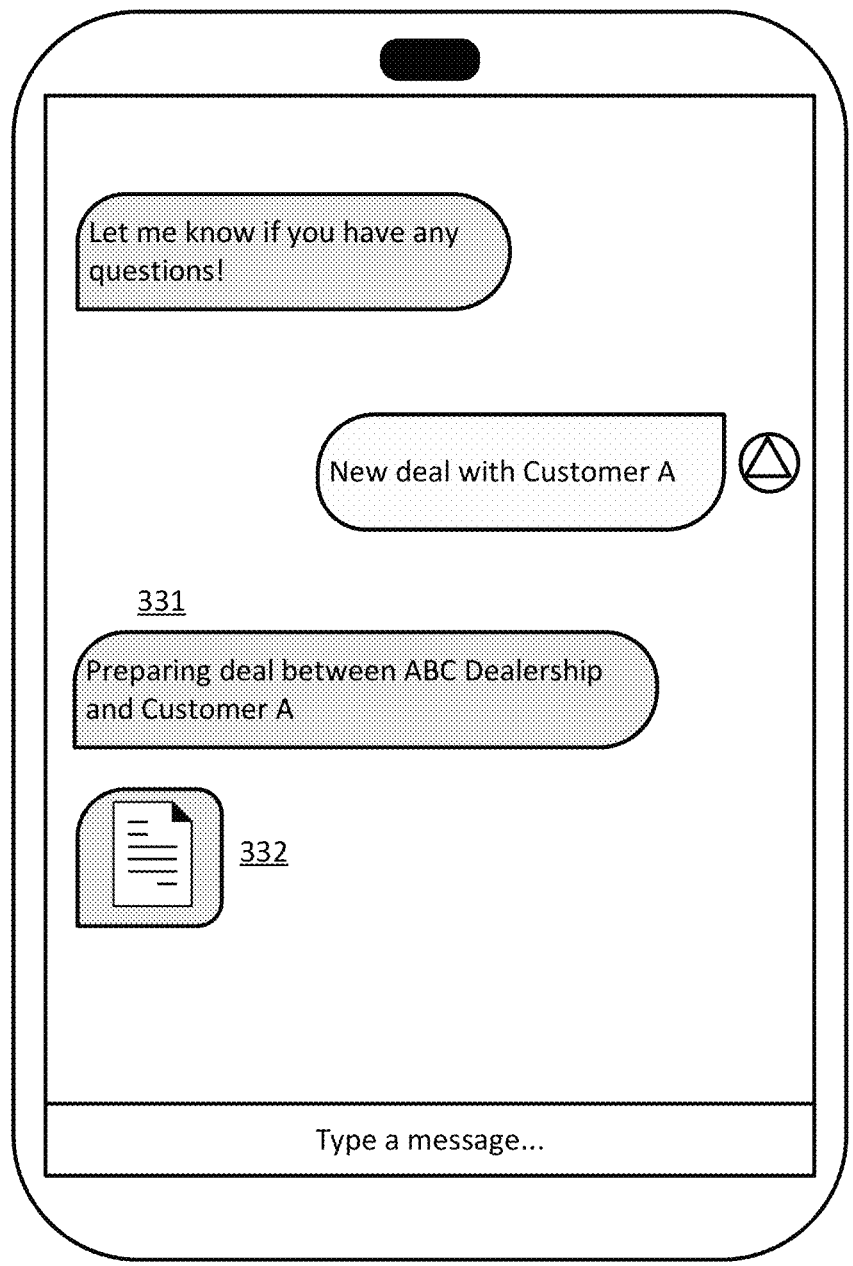
FIG. 3C illustrates one embodiment of a user interface that produces documents in response to user input.

FIG. 3A illustrates one embodiment of a user interface that triggers operation of the query system to produce search results. As illustrated in FIG. 3A, user interface 310 includes outputs 311, inputs 312, and input mechanism 313. Outputs 311 are messages initiated by chat bot system 130. Inputs 312 are messages input by a user using input mechanism 313. Input mechanism 313 is illustrated as a text field, but this is merely exemplary, and such mechanisms may be input using voice or any other manner of input as well. As illustrated in FIG. 3A, a user inputs "total deals closed this month," and chat bot system 130 responds with an output of "ABC Dealership closed 157 deals this February." The output is determined by chat bot system 130 using intent prediction module 206 to determine intent of the input, and by using entity extraction module 208 to determine entities in the input, and by generating a query using the determined intent and entities. This seamlessly allows a query to be generated regardless of database format to which the query is directed, and therefore allows a response to be output to user input using a chat bot interface.

FIG. 3B illustrates one embodiment of a user interface that recommends alternative queries. As shown in FIG. 3B, user interface 310 includes selectable options 323. Query recommendation module 220 generates recommended input queries for a user based on input queries received from a user, and presents each of them as selectable options 323, the selectable options 323 being selectable for entry of the recommended input query to drive a search. In an embodiment, in order to generate the recommended input queries, query recommendation module 220 identifies intent and/or entities in a prior input, and changes at least one intent or entity to a related intent or entity. In an embodiment, pre-defined templates may be used each having slots, where, when a user enters a query, based on entities from the entered query each template's slot is populated with values alternate to a current extracted entity from a predefined set. For example, a "closed" entity can be replaced with related alternatives such as "open," "booked," "voided," and so on. Related entities may be pre-defined or may be learned. For example, an administrator may program that that an entity of "closed" maps to related entities of "booked," "opened," and "sold." Alternatively or additionally, query recommendation module 220 may apply an input string into a model. The model may be a machine learning model or a statistical model, trained using historical data, where follow-up search queries in a chat bot session are correlated to initial queries and/or to one another, and these correlations are increased or decreased depending on initial and follow-up search queries used in other sessions. Related or entities may be randomly selected (e.g., initially, before historical data is developed to add biases to random selection). In an embodiment, query recommendation module 220 may be a machine learning model that generates recommendations for a given user query. The machine learning model may be trained using historical queries as labeled by entities within those queries that were selected to be swapped from the selectable options 323.

After recommended input queries are identified, the recommendations may be displayed using selectable options 323, where a selection of one of selectable options 323 would result in a corresponding input string being used to obtain results corresponding to that recommendation. While only partial queries are displayed in FIG. 3B in the context of selectable options 323, this is merely for illustrative purposes, and full queries may instead be displayed (e.g., "total deals [booked/opened/sold] this month").

FIG. 3C illustrates one embodiment of a user interface that produces documents in response to user input. Document production module 222 detects entry of a request to produce a document. In an embodiment, document production 222 detects entry of such a request by detecting intent and entities as described above, where the intent is to trigger a create action as an event, and an entity of deal as depicted is an entity identifying what to create, and name identifies another entity as a person. Document production module 222 would pre-fill the extracted items from the user's text input in the required form fields. Such an event may trigger producing documents from an intermediate JSON based on application use, where here the application use is document production. In an embodiment, document production module 222 detects entry of such a request by comparing text input by the user (e.g., "New deal with customer A") to templates, where when a template is matched, entry of a request for production of a document associated with the template is determined. The text may be compared in whole or in part with the template. For example, "new deal with [name of customer]" may be a template, and when this template is matched, a corresponding document (e.g., a deal sheet) may be accessed. Document production module 222 may pre-fill the form with known information (e.g., all known information currently known about Customer A, such as name, address, and so on). Matching may be exact or partial (e.g., to accommodate for spelling errors).

FIG. 4 illustrates an exemplary process for operating a query system, in accordance with one embodiment of the disclosure. Process 400 may be executed by one or more processors 501 of FIG. 5, which may operate to execute modules of chat bot system 130. Process 400 begins with chat bot system 130 receiving 410, through a user interface, a first query from a user associated with a vehicle dealership (e.g., using user interface module 214). Optionally, chat bot system may execute pre-processing module 202 and/or audio data processing module 204 in connection with the receiving of the first query. Chat bot system 130 applies 420 the first query to a first trained machine learning model configured to predict an intent of the first query (e.g., using intent prediction module 206).

Chat bot system 130 applies 430 the first query to a second trained machine learning model configured to predict a set of entities of the first query (e.g., using entity extraction module 208). Chat bot system 130 generates 440 a normalized representation of the first query based on the predicted intent and the predicted set of entities, where a format of the normalized representation of the first query is database language agnostic (e.g., using query generation module 210). Chat bot system 130 translates 450 the normalized representation of the first query into a second query having a format compatible with a language of a database of the car dealership (e.g., using database determination module 212). Chat bot system 130 fetches 460 data from the database of the car dealership associated with the predicted intent and the predicted set of entities using the second query, and provides 470, on the user interface, the data for display to the user.

Computing Machine Architecture

Figure 5:
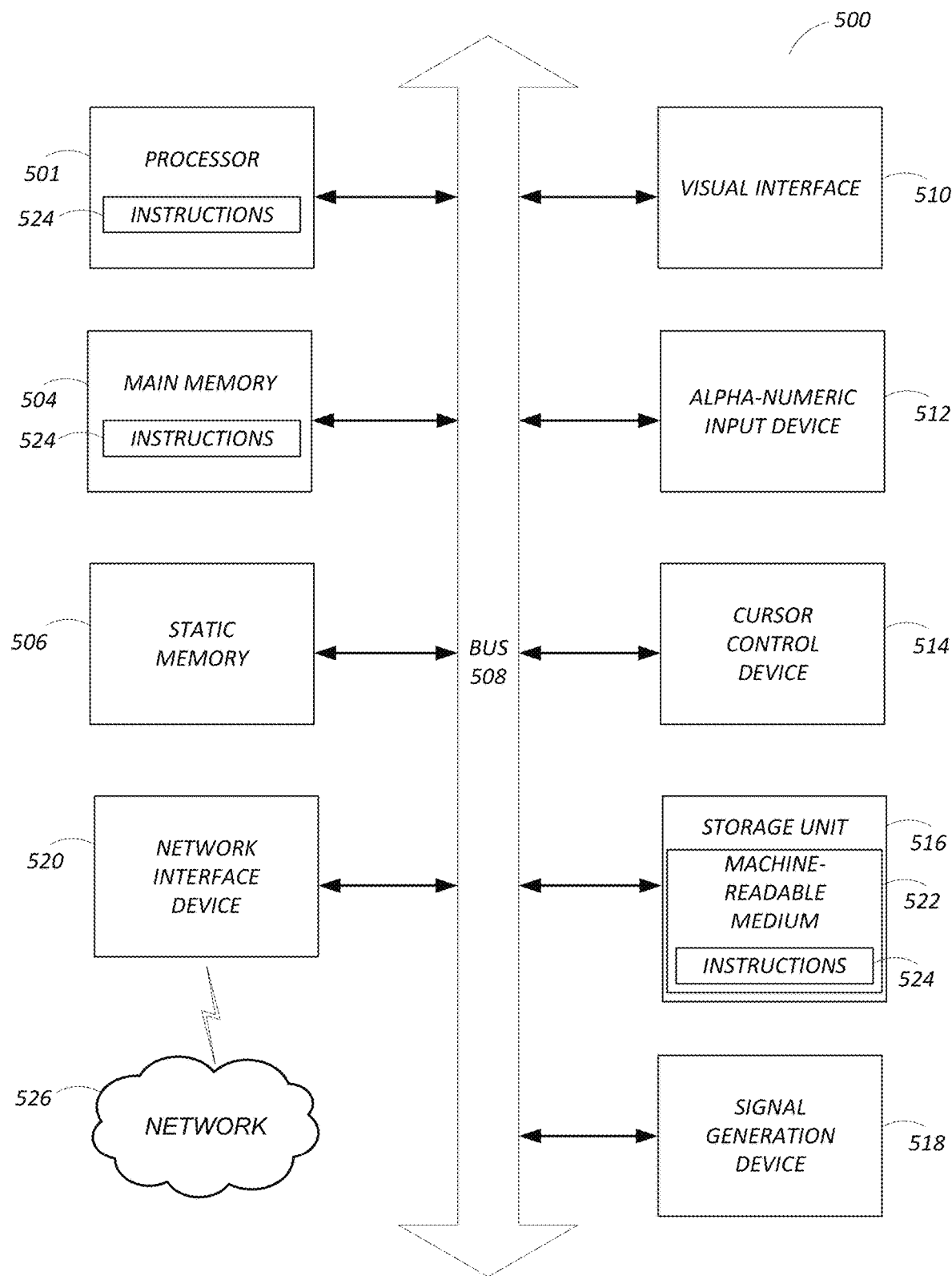
(FIG. 5 is a block diagram illustrating components of an example machine able to read instructions from a machine-readable medium and execute them in a processor (or controller).

FIG. (FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 524 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 500 includes one or more processors 502 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 504, and a static memory 506, which are configured to communicate with each other via a bus 508. The computer system 500 may further include visual display interface 510. The visual interface may include a software driver that enables (or provide) user interfaces to render on a screen either directly or indirectly. The visual interface 510 may interface with a touch enabled screen. The computer system 500 may also include input devices 512 (e.g., a keyboard a mouse), a storage unit 516, a signal generation device 518 (e.g., a microphone and/or speaker), and a network interface device 520, which also are configured to communicate via the bus 508.

The storage unit 516 includes a machine-readable medium 522 (e.g., magnetic disk or solid-state memory) on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for enabling a chat bot system to perform accurate database queries for a vehicle dealership having multiple different databases with different formats through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving, through a user interface, a first query from a user associated with a vehicle dealership;
   applying the first query to a first trained machine learning model configured to predict an intent of the first query;
   applying the first query to a second trained machine learning model configured to predict a set of entities of the first query;
   generating a normalized representation of the first query based on the predicted intent and the predicted set of entities, wherein a format of the normalized representation of the first query is database language agnostic, and wherein generating the normalized representation comprises filtering out a subset of metadata from an interim representation of the first query that precedes the normalized representation of the first query, the filtering out based on an importance value for each metadata of the subset being below a threshold level of importance;
   translating the normalized representation of the first query into a second query having a format compatible with a language of a database of the vehicle dealership;
   fetching data from the database of the vehicle dealership associated with the predicted intent and the predicted set of entities using the second query; and
   providing, on the user interface, the data for display to the user.

2. The method of claim 1, wherein the first query is a text query, the method further comprising:
   pre-processing the text query using a natural language processing model configured to identify spelling errors in the text query; and
   responsive to identifying one or more spelling errors in the text query, modifying the text query to remove the one or more spelling errors.

3. The method of claim 1, wherein the first query is a voice query, the method further comprising:
   receiving audio data from the user via the user interface, the audio data associated with the first query; and
   applying the audio data to a third trained machine learning model configured to generate a transcript from the audio data; and
   generating a text query from the transcript.

4. The method of claim 1, wherein the first trained machine learning model is a classification model.

5. The method of claim 4, wherein the classification model is a supervised machine learning model, and wherein the supervised machine learning model is configured to classify the first query as one or more of an overall intent query, a sales query, or a services query.

6. The method of claim 1, further comprising: extracting metadata associated with the vehicle dealership, wherein the normalized representation of the first query is further based on the extracted metadata.

7. The method of claim 1, wherein the first query is associated with a requested action, the method further comprising:
   accessing one or more documents associated with the requested action;
   accessing metadata associated with the user;
   inputting one or more metadata values into the one or more documents based on the requested action; and
   providing for display the one or more documents to the user via the user interface.

8. The method of claim 1, further comprising:
   generating a query recommendation for an additional query based on the predicted set of entities of the first query;
   providing the query recommendation for the additional query for display on the user interface; and
   responsive to receiving an indication that the user interacted with the additional query:
      fetching data associated with the additional query; and
      providing the data associated with the additional query for display to the user.

9. The method of claim 1, wherein the second trained machine learning model is an entity determination model, and wherein an entity of a query describes a category of a term of the query.

10. The method of claim 9, wherein the entity determination model is a deep learning model.

11. The method of claim 1, wherein generating the normalized representation of the first query further comprises filtering data associated with the first query based on a level of importance associated with one or more data values, and wherein the normalized representation includes data with at least a threshold level of importance.

12. The method of claim 1, wherein an entity of the predicted set of entities is associated with a first value in a set of values, the method further comprising:
   randomizing an additional query recommendation for an additional query based on additional values in the set of values; and
   providing the randomized additional query recommendation for the additional query for display on the user interface.

13. The method of claim 1, further comprising: updating a method of randomizing an additional query recommendation based on one or more responses to additional query recommendations from vehicle dealerships.

14. A non-transitory computer-readable medium comprising memory with instructions encoded thereon, the instructions, when executed, causing one or more processors to perform operations, the instructions comprising instructions to:

receive, through a user interface, a first query from a user associated with a vehicle dealership;

apply the first query to a first trained machine learning model configured to predict an intent of the first query;

apply the first query to a second trained machine learning model configured to predict a set of entities of the first query;

generate a normalized representation of the first query based on the predicted intent and the predicted set of entities, wherein a format of the normalized representation of the first query is database language agnostic, and wherein generating the normalized representation comprises filtering out a subset of metadata from an interim representation of the first query that precedes the normalized representation of the first query, the filtering out based on an importance value for each metadata of the subset being below a threshold level of importance;

translate the normalized representation of the first query into a second query having a format compatible with a language of a database of the vehicle dealership;

fetch data from the database of the vehicle dealership associated with the predicted intent and the predicted set of entities using the second query; and provide, on the user interface, the data for display to the user.

15. The non-transitory computer-readable medium of claim 14, wherein the first query is a text query, and wherein the instructions further comprise instructions to:

pre-process the text query using a natural language processing model configured to identify spelling errors in the text query; and responsive to identifying one or more spelling errors in the text query, modify the text query to remove the one or more spelling errors.

16. The non-transitory computer-readable medium of claim 14, wherein the first query is a voice query, and wherein the instructions further comprise instructions to:

receive audio data from the user via the user interface, the audio data associated with the first query; and apply the audio data to a third trained machine learning model configured to generate a transcript from the audio data; and generate a text query from the transcript.

17. The non-transitory computer-readable medium of claim 14, wherein the first trained machine learning model is a classification model.

18. The non-transitory computer-readable medium of claim 17, wherein the classification model is a supervised machine learning model, and wherein the supervised machine learning model is configured to classify the first query as one or more of an overall intent query, a sales query, or a services query.

19. A system comprising:

memory with instructions encoded thereon; and one or more processors that, when executing the instructions, are caused to perform operations comprising:

receiving, through a user interface, a first query from a user associated with a vehicle dealership;

applying the first query to a first trained machine learning model configured to predict an intent of the first query;

applying the first query to a second trained machine learning model configured to predict a set of entities of the first query;

generating a normalized representation of the first query based on the predicted intent and the predicted set of entities, wherein a format of the normalized representation of the first query is database language agnostic, and wherein generating the normalized representation comprises filtering out a subset of metadata from an interim representation of the first query that precedes the normalized representation of the first query, the filtering out based on an importance value for each metadata of the subset being below a threshold level of importance;

translating the normalized representation of the first query into a second query having a format compatible with a language of a database of the vehicle dealership;

fetching data from the database of the vehicle dealership associated with the predicted intent and the predicted set of entities using the second query; and providing, on the user interface, the data for display to the user.

20. The system of claim 19, wherein generating the normalized representation of the first query further comprises filtering data associated with the first query based on a level of importance associated with one or more data values, and wherein the normalized representation includes data with at least a threshold level of importance.

* * * * *